PHOTOELECTRIC STEREOPLOTTER USING A SINGLE LIGHT SOURCE

Filed March 28, 1962 9 Sheets-Sheet 1

INVENTOR.
KNIGHT V. BAILEY
DANIEL C. KOWALSKI
BY
Richard J. Seegar
ATTORNEY

INVENTOR.
KNIGHT V. BAILEY
DANIEL C. KOWALSKI
BY
Richard T. Seeger
ATTORNEY

Aug. 16, 1966 K. V. BAILEY ETAL 3,267,286

PHOTOELECTRIC STEREOPLOTTER USING A SINGLE LIGHT SOURCE

Filed March 28, 1962 9 Sheets-Sheet 3

INVENTORS
KNIGHT V. BAILEY
DANIEL C. KOWALSKI
BY
Richard I. Seeger
ATTORNEY

PHOTOELECTRIC STEREOPLOTTER USING A SINGLE LIGHT SOURCE

Filed March 28, 1962 9 Sheets-Sheet 4

INVENTORS
KNIGHT V. BAILEY
DANIEL C. KOWALSKI
BY
Richard T. Seeger
ATTORNEY

INVENTORS
KNIGHT V. BAILEY
DANIEL C. KOWALSKI
BY
Richard I. Seeger
ATTORNEY

INVENTORS
KNIGHT V. BAILEY
DANIEL C. KOWALSKI
BY
Richard J. Seeger
ATTORNEY

INVENTORS
KNIGHT V. BAILEY
DANIEL C. KOWALSKI
BY
Richard J. Seeger
ATTORNEY

INVENTORS
KNIGHT V. BAILEY
DANIEL C. KOWALSKI
BY
Richard I. Seeger
ATTORNEY

INVENTOR.
KNIGHT V. BAILEY
DANIEL C. KOWALSKI

BY Richard T. Seeger
ATTORNEY

United States Patent Office 3,267,286
Patented August 16, 1966

3,267,286
PHOTOELECTRIC STEREOPLOTTER USING A SINGLE LIGHT SOURCE

Knight V. Bailey, Allen Park, and Daniel C. Kowalski, Wyandotte, Mich., assignors to The Bendix Corporation, Southfield, Mich., a corporation of Delaware
Filed Mar. 28, 1962, Ser. No. 183,101
9 Claims. (Cl. 250—219)

This invention pertains to a method and system for measuring and identifying the correspondence in detail between two images, and more specifically, for automatic stereo perception particularly useful in forming contour and profile lines for map making from stereophotographs.

In the field of photogrammetry, the science or art of utilizing stereo perception to obtain reliable measurements of elevation and position of terrain from a single stereoscopic pair of photographs is well known. Two aerial photographs of the same terrain taken at different points in the same horizontal plane are compared to obtain points of equal elevation. A characteristic of true vertical stereophotographs is that all points at a given elevation on one photograph will "coincide" exactly with the same points on the second photograph. When these constant elevation points merge to form a random type curve, the curve is called a contour line. Thus, if the two stereophotographs were placed one above the other, the contour lines for a given elevation could be made to lie exactly in coincidence by displacing in a horizontal plane one photograph relative to the other. For each elevation, there is a corresponding displacement at which the lines at that elevation coincide. By following these lines manually or automatically, contour lines of equal elevation can be traced.

Numerous complex systems have been devised to aid the operator in plotting terrain and relief maps. The fidelity and speed of stereoplotting in these manual devices is necessarily limited by the skill of the operator. Included in the prior art is an automatic device that performs stereoplotting without resorting to visual means of an operator and uses an electronic correlation technique which is described in Patent No. 2,964,643 dated December 13, 1960, issued to G. L. Hobrough. In Hobrough's apparatus a photocell is placed behind each of two photographic transparencies and a spot of light from the other side of the transparencies is detected by the individual photocells. Complex electronic equipment is utilized to multiply and average the outputs of the photocells in a given time period.

Objects in our invention are to correlate finite areas in the stereo transparencies by means of a two dimensional analysis in a spatial coordinate system rather than the time domain; to correlate instantaneously and to make unnecessary complex electronic image correlation equipment in a stereo perception system for measurements of elevation and position of terrain for map making. In our system two dimensional correlation is performed by optical analog techniques utilizing a light source, a lens system, and a single light sensitive detector. In a preferred embodiment, the two stereo transparencies are placed in tandem between a collimating lens and a photomultiplier tube such that the planes of the transparencies intersect the optical or center axis of the lens and photomultiplier tube system. A point light source is placed in the focal plane of the lens on the opposite side of the transparencies. The lens refracts the radial wave fronts emitted by the point light source such that the light rays are parallel when they emerge from the opposite side of the lens. This solid cylinder of light rays passes consecutively through finite circular areas of the stereo transparencies and is collected by the photomultiplier tube.

In this system, multiplication is accomplished by the transmittances of the two transparencies arranged normal to the optical axis. If one considers a single light ray in the solid cylinder of parallel rays emanating from the lens, the intensity of the ray of light emerging from the first transparency is proportional to the transparency's transmittance at that point. This same ray of light is in the same manner reduced in intensity again by the transmittance of the second transparency. The intensity of the light emerging from the second transparency is therefore diminished by the product of the transmittances of the stereo transparencies at the points in question. Each light ray in the solid cylindrical bundle of parallel rays experiences the same type of attenuation in intensity. Summing and averaging of these light rays is performed by a photomultiplier tube. The light rays are all intercepted by the photomultiplier tube which is placed behind the second transparency on the optical axis.

When the areas of the stereo transparencies cut by the solid cylinder of light contain the same images, that is, density distributions, the photomultiplier will have a maximum output. When the point source of light lies on the optical axis and the photomultiplier tube has a maximum output, the two images must likewise lie opposite of one another on the optical axis. The maximum output will be on a line which passes through the two areas which have matching images.

In this invention the point source of light is generated by an electron beam striking the fluorescent surface of a cathode ray tube. The beam is systematically moved across a small area to interrogate the stereo transparencies as to points where areas match. When one of the matched images is on the optical axis and the other is off the optical axis, a signal is generated which either moves one transparency in its plane relative to the other for tracing profile lines to align the matched area or moves the optical system, holding the transparencies stationary, for tracing contours.

It is a main object of the present invention to achieve a sensing operation in which a selected small area in one photograph and its corresponding image in a second photograph can be located and identified, without resorting to the visual inspection by means of optical correlation.

It is another object of the invention to adapt the image correlating method to stereophotography in which a selected spot in one photograph of a stereo pair is automatically located in the other photograph.

It is a further object of the invention to provide an inspection system adapted for photogrammetry in which the terrain common to both stereophotographs can be interrogated systematically to plot in a continuous manner contour and profile lines to facilitate the making of terrain and relief maps.

These objects, together with other features and advantages of this invention, will become more apparent when preferred embodiments of this invention are considered in connection with the accompanying drawings.

Figure 8:
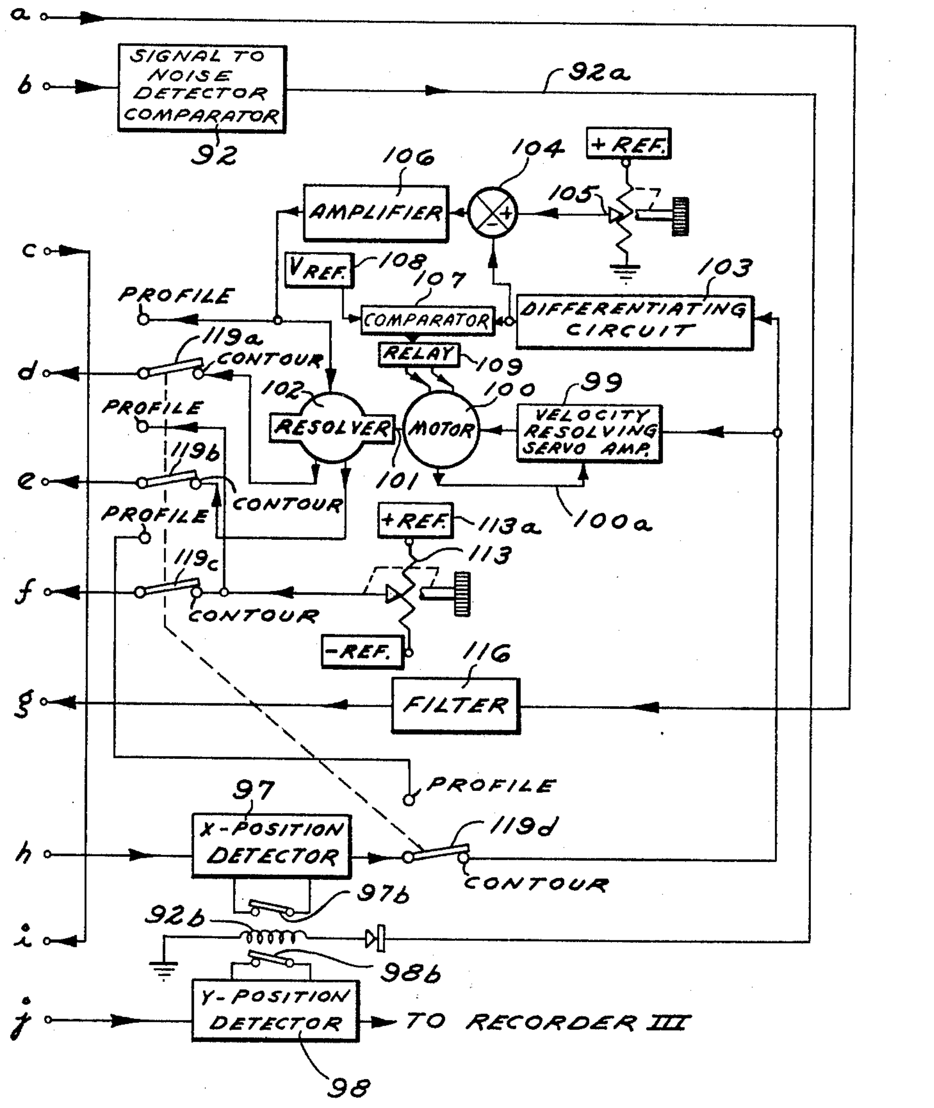
FIGURE 8 is a partially schematic, partially block, and partially elevational view of a second preferred embodiment of this invention.
Figure 8:
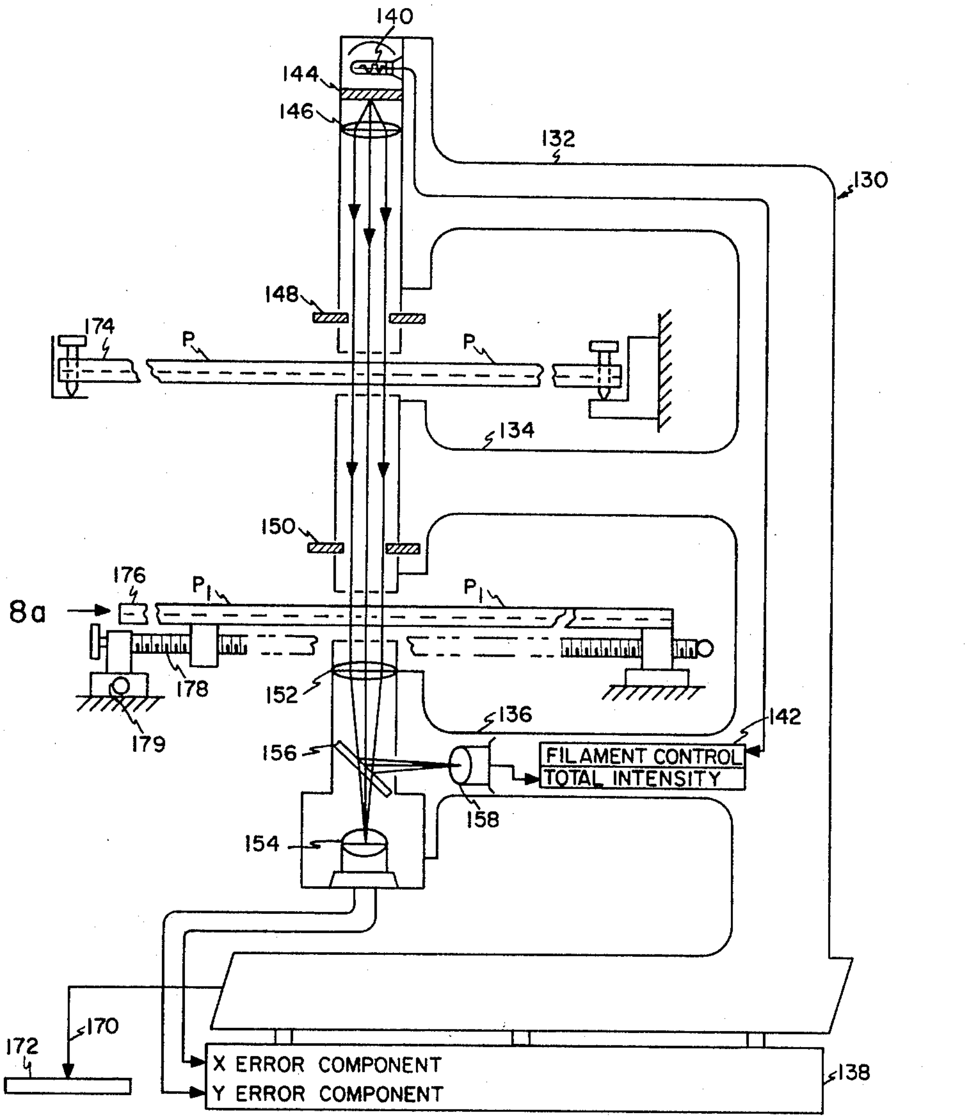
Figure 8A:
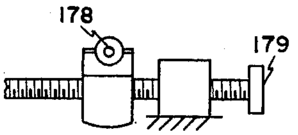

FIGURE 8*a* is an enlarged view taken from direction 8*a* in FIGURE 8; and

FIGURE 9 is schematic plan view of the photocell used in the embodiment of FIGURE 8.

Figure 1:
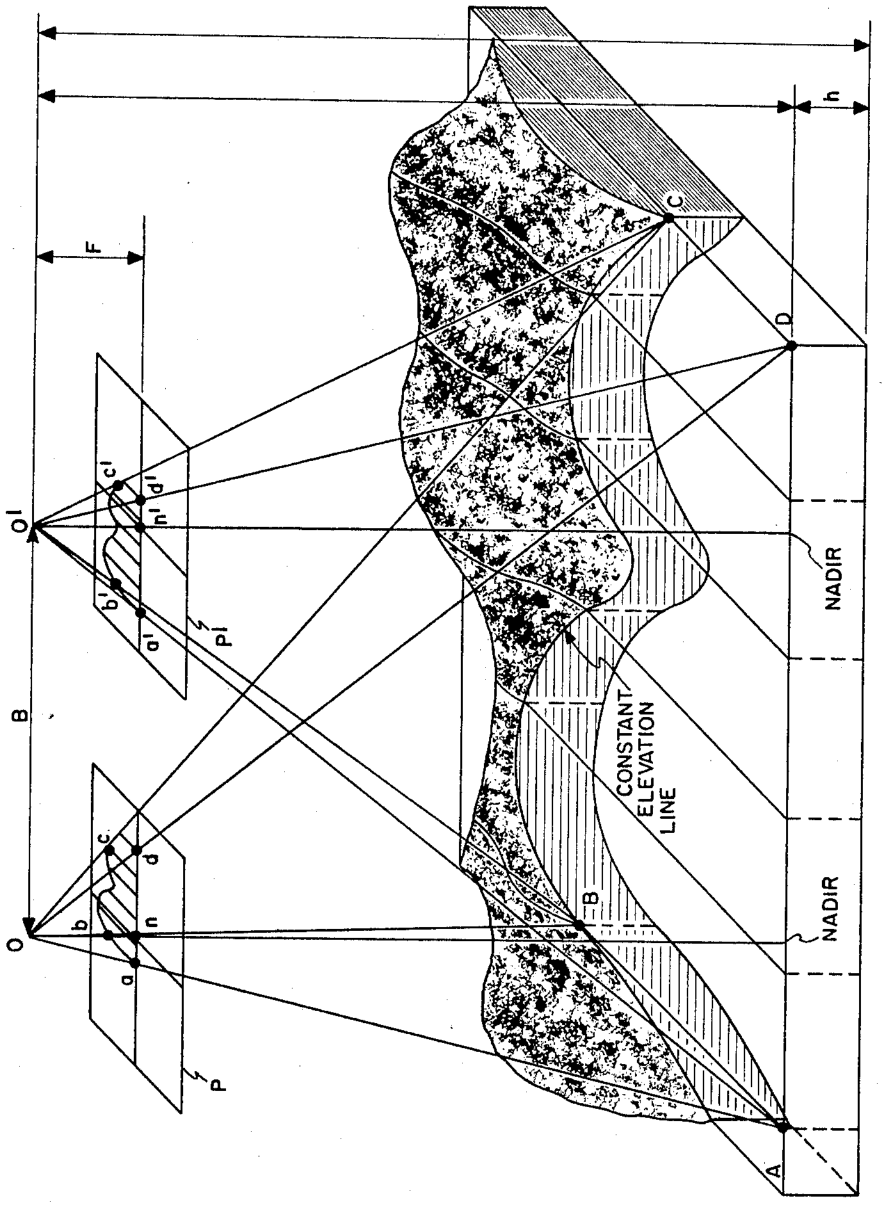
FIGURE 1 is a drawing showing a perspective view of a section of terrain and its graphical relation with a pair of stereophotographs useful in illustrating the principle of stereo perception used in map making by the system and method herein.

FIGURE 1 illustrates the concept of stereo perception and the manner in which different elevation contour lines are identified. Aerial photograph P is taken a distance B from aerial photograph P′. Curve *b-c* of photograph P and curve *b′-c′* on photograph P′, represent the contour line B-C of the representation of the terrain. Curve *b-c* and curve *b′-c′* have the same dimensions and shape, but are displaced from their respective nadir points, *n* and *n′* respectively, by different amounts. In other words, the distance *a-n* in photograph P is smaller than the distance of *a′-n′* in photograph P′ by an amount which corresponds to elevation *h*. For each elevation, the difference between the distance *a-n* and the distance *a′-n′* would be correspondingly different.

In this description, P and P′ while referred to at times simply as photographs, are photographic transparencies. These transparencies can be either negative or positive (diapositive) and in the preferred embodiments, as described below, they are the same, whether negative or positive.

Figure 2:
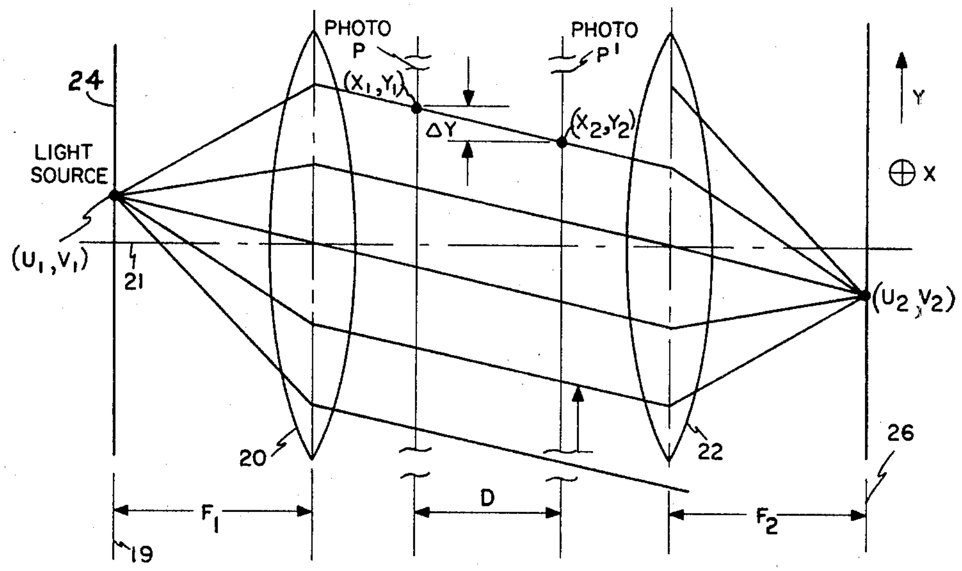
FIGURE 2 is a sectional view of the lenses and photographic transparencies illustrating the principle utilized in our invention.

FIGURE 2 shows the concept of automatic stereo perception by means of optical correlation utilized in this invention. Photographic transparencies P and P′ are placed in parallel relationship to each other and between identical convex lenses 20 and 22. Photograph P′ is placed lower than photograph P by an amount $\Delta Y$ which corresponds to a given elevation.

A light source 24 having an infinite number of point light sources is placed in the focal plane of projection lens 20. For the sake of illustration, only one point light source at $(u_1, v_1)$, will be considered. Rays from point $(u_1, v_1)$ are made parallel by lens 20 and then pass through an area of photographs P and P′. These parallel rays, the uppermost of which passes through photograph P at $x_1, y_1$, and photograph P′ at $(x_2, y_2)$, are caused to converge or be summed by integrating lens 22 at spot $(u_2, v_2)$, on a screen 26 which is in the focal plane of lens 22.

Each of the parallel rays from $(u_1, v_1)$ is diminished first by a factor corresponding to the transmittance of the emulsion of photograph P through which the individual ray passes and then by a factor corresponding to the emulsion on photograph P′. If the photograph P and P′ are aligned so that the emulsions contacted by the rays from point $(u_1, v_1)$ are similar, then there will be a maximum or a bright spot formed at $(u_2, v_2)$ that is brighter than all the other points on the screen 26, providing photographs P and P′ have random density distribution. It is well known from random noise theory that when a random function is multiplied by another random function and the products of the multiplications are totaled, the result will be zero unless the random functions are aligned (in phase) and identical, in which case there will be a maximum total. In effect we are reducing, or multiplying, the intensity of each light ray by the transmittance of the emulsion on one photograph P by the other photograph P′ and we are summing the products of the multiple parallel rays when lens 22 causes them to converge on screen 26.

The effect of passing light through lens 20, photographs P and P′, and lens 22 will be to provide one maximum spot, or light spot on a dark background in the case where photographs P and P′ are either both negatives or both diapositives; or a minimum, which is a dark spot on the light background where one photograph is a negative and the other photograph is a diapositive.

This principle is also illustrated by the following mathematical discussion. Referring to FIGURE 2, rays of light originating from a point source at a position $(u_1, v_1)$ in the focal plane 19 of lens 20 are formed into a collimated (parallel) beam of uniform intensity $I_0$ by the projecting lens 20. The amount of inclination of the parallel ray beam to the optical axis 21 is dependent on the focal length $F_1$ of lens 1 and on the distance of the point $(u_1, v_1)$ from the optical axis. Photographs P and P′ have transmittances $T_1(x, y)$ and $T_2(x, y)$. A single ray of light passing through a point $(x_1, y_1)$ on photograph P emerges with the intensity $I_0 \cdot T_1(x_1, y_1)$. After passing through a point $(x_2, y_2)$ on photograph P′, it emerges with an intensity $I_0 \cdot T_1(x_1, y_1) \cdot T_2(x_2, y_2)$.

The point $(x_2, y_2)$ is determined by the inclination of the parallel ray beam to the optical axis and by the distance D between the photographs. It can be expressed as $(x_1+\Delta x, y_1+\Delta y)$. Since all rays are parallel, the horizontal and vertical displacements $\Delta x$ and $\Delta y$ do not vary with the position of a ray within the parallel "bundle." Thus the intensity of the beam after passing through both photographs is $I_0 \cdot T_1(x_1, y_1) \cdot T_2(x_1+\Delta x, y_1+\Delta y)$.

The parallel beam now impinges upon the lens 22, which focuses all of the light at some point $(u_2, v_2)$ in the focal plane 26 of lens 22. Because of the integrating action of lens 22, the light intensity at point $(u_2, v_2)$ can be written as follows:

$$I(u_2, v_2) = I_0 \iint_A T_1(x, y) T_2(x+\Delta x, y+\Delta y)\,dx\,dy \quad (1)$$

where A is the effective area of the parallel beam. It is seen that the integral in Equation 1 has the form of the finite two-dimensional cross-correlation function between $T_1(x, y)$ and $T_2(x, y)$, evaluated for a constant displacement $(\Delta x, \Delta y)$.

For a point source at any position in the focal plane 19 of lens 20, development would be similar. The resulting light intensity at some corresponding point in the focal plane 26 of lens 22 would be proportional to the cross-correlation function between $T_1$ and $T_2$ evaluated for a different displacement $(\Delta x, \Delta y)$.

Now, if a uniform diffuse light source is placed in the focal plane 19 of lens 20, the effect is one of an infinite number of point sources placed an infinitesimal distance apart. Each point source gives rise to a point in the focal plane 26 of lens 27 having an intensity proportional to a point on the cross-correlation function between transmittances $T_1$ and $T_2$. The cumulative effect is thus a continuous distribution of intensity in the focal plane of lens 22 which is proportional to the complete two-dimensional cross-correlation function between the two photographic images. At any point in the focal plane 26 of the integrating lens 22, the intensity is dependent only on the displacement $(\Delta x, \Delta y)$ and hence may be expressed as $$I(u_2, v_2) = I_0 \iint_A T_1(x, y) T_2(x+\Delta x, y+\Delta y)\,dx\,dy = K\phi_{12}(\Delta x, \Delta y) \quad (2)$$

where $\phi_{12}(\Delta x, \Delta y)$ is the cross-correlation function between transmittance $T_1(x, y)$ and $T_2(x, y)$.

This system in effect performs instantaneously the infinite number of multiplications and integrations necessary to compute the value of the correlation function for an infinite number of displacements ($\Delta x$, $\Delta y$). Optical correlation is performed instantaneously and yields a complete two-dimensional correlation function without any explicit computation or processing of data.

Figure 3:
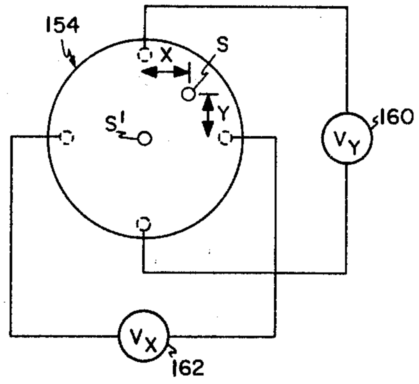
FIGURE 3 is a perspective diagram of the lenses and photographic transparencies illustrating the principle utilized in our invention.
Figure 3:
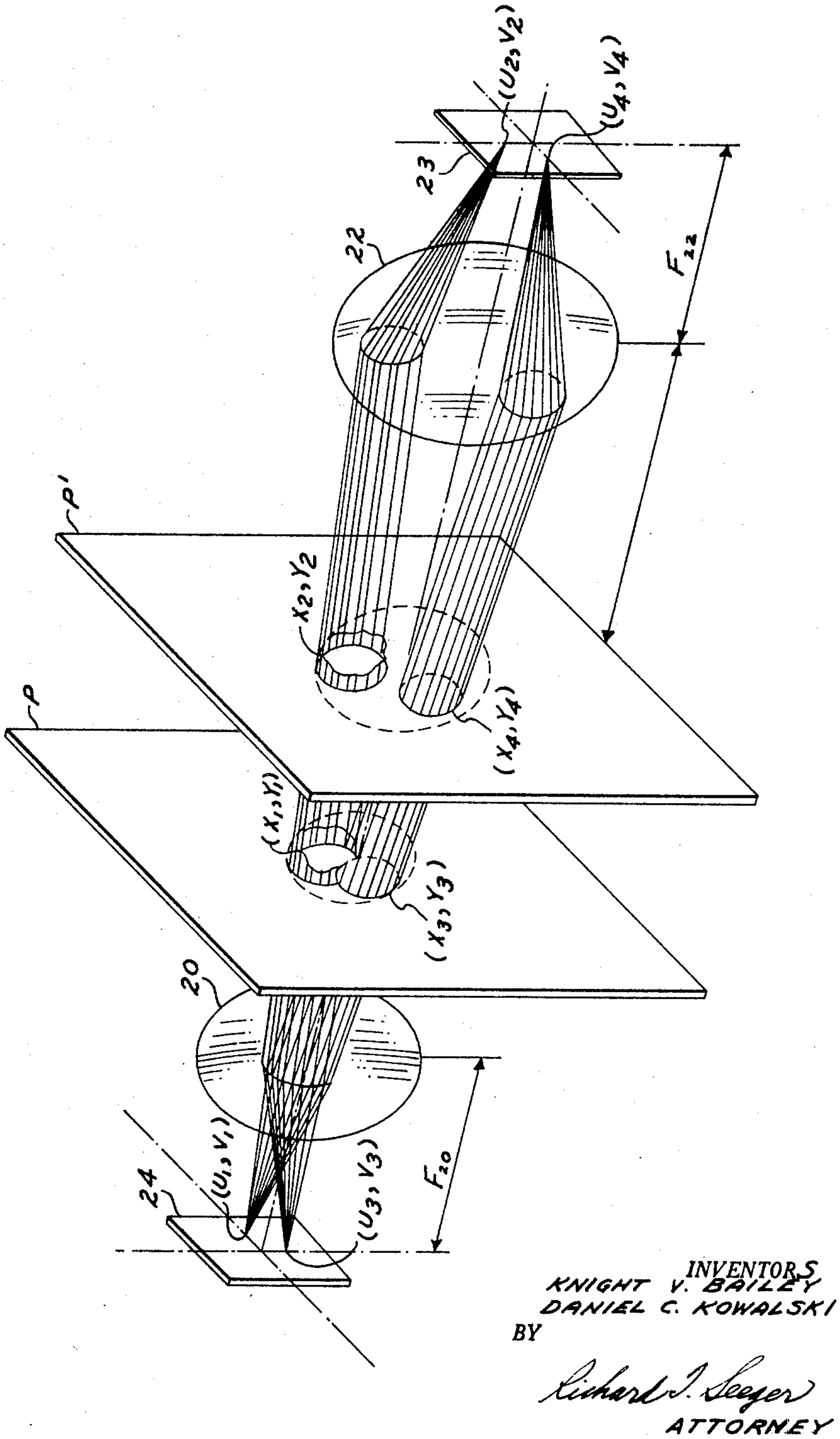

FIGURE 3 is a view in perspective of the system shown in FIGURE 2. FIGURE 3 is intended to further illustrate the principle utilized in this invention and show two spots ($U_1$, $V_1$) and ($U_3$, $V_3$) of light originating from source 24, which is in the focal plane of lens 20, with source 24 having an infinite number of point light sources of which ($U_1$, $V_1$) and ($U_3$, $V_3$) are only two.

The light from sources ($U_1$, $V_1$) and ($U_3$, $V_3$) are formed into parallel or collimated beams of light by lens 20 and then proceed to intercept photos P and P′ at points ($X_1$, $Y_1$) and ($X_2$, $Y_2$) respectively for point source ($U_1$, $V_1$); and ($X_3$, $Y_3$) and ($X_4$, $Y_4$) respectively, for point source ($U_3$, $V_3$). The collimated beams are then integrated or refocused by lens 22 onto screen 23 at points ($U_2$, $V_2$) and ($U_4$, $V_4$) respectively, which may be the face of a phototube, and which is in the focal plane of lens 22.

There is an infinite number of such beams going through photo-transparencies P and P′ and if any one of them passes through identical areas on photo transparencies P and P′, its integration or focus on screen 23 will be brighter than the other points on screen 23. By moving photos P and P′ relative light source 24, lenses 20, 22 and screen 23, in such a manner so as to keep the bright spot at a predetermined point on the screen 23, and by recording the movement of photos P and P′, a line of equal elevation, or contour, will be traced or recorded.

Figure 4:
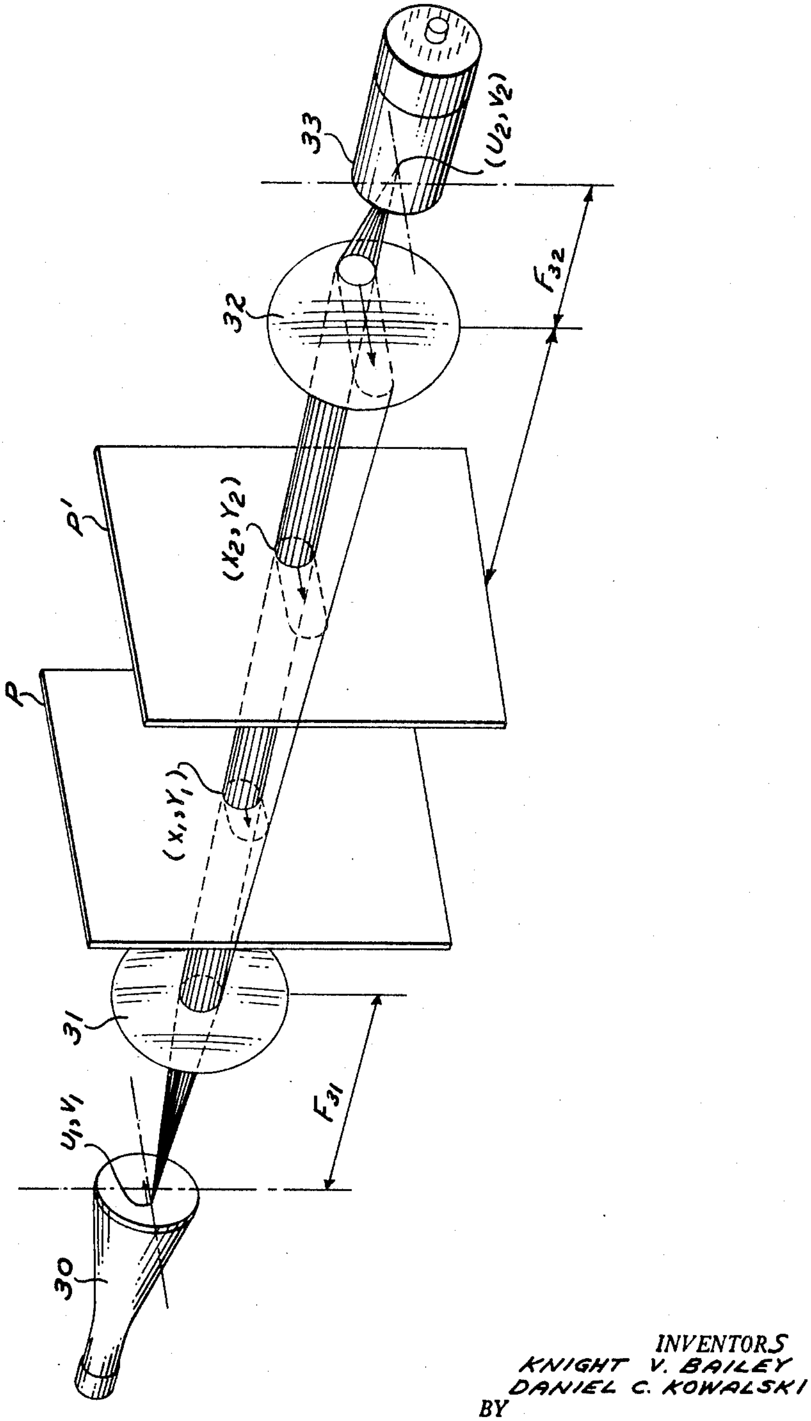
FIGURE 4 is a perspective explanatory diagram of the preferred embodiment of our invention shown in FIGURE 5.

FIGURE 4 is a simplified explanatory view of the principle utilized in a preferred embodiment which will be explained in more detail below. A cathode ray tube 30 is supported in fixed relation to a collimating lens 31, an integrating lens 32, and a photomultiplier tube 33. These last named elements are movable relative to stereophoto transparencies P and P′.

In this embodiment, instead of having a light source emitting an infinite number of point sources, the light source is a cathode ray tube 30 which emits a point of light that moves over the face of the tube in a controlled and known manner. When the spot ($U_1$, $V_1$) is at such a position on the face of tube 30 that its collimated beam passes through identical areas of phototransparencies P and P′, a maximum will be focused or integrated on the face of photo tube 33. By comparing at what times this happens with the positions of photo transparencies P and P′, contour lines can likewise be traced by this embodiment.

The integrating lens 32 shown in FIGURE 4 is unnecessary if the photomultiplier tube 33 has a large enough surface and is placed closely enough to photo transparency P′. In fact, in one of the preferred embodiments next to be described, there is no integrating lens 32. The reason that no integrating lens is necessary, is that the column of light from a spot $U_1$, $V_1$ is small enough so that it does not have to be focused or integrated to notice a correlation or bright spot.

Figure 5:
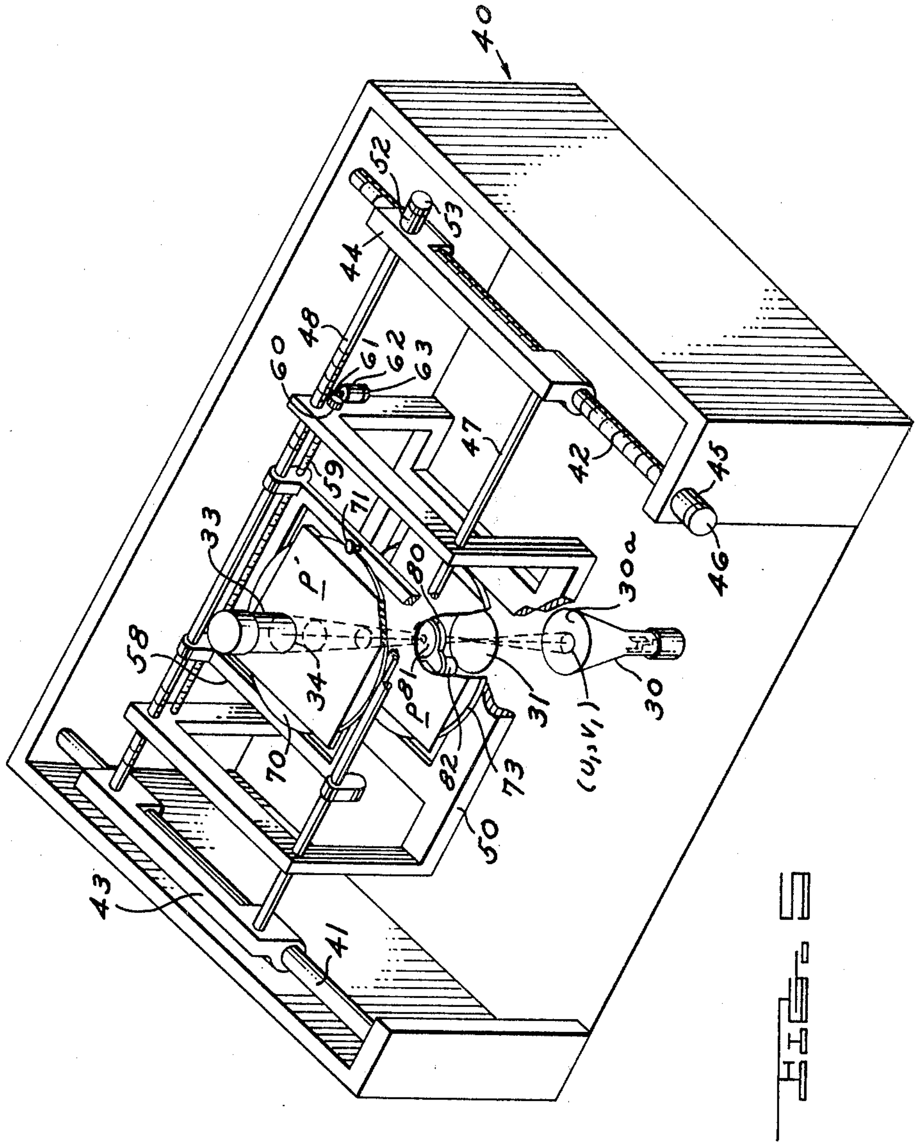
FIGURE 5 is a diagrammatic perspective of a preferred embodiment of the apparatus useful for generating contour or profile lines from a stereoscopic pair of photographic transparencies according to our invention.
Figure 6:
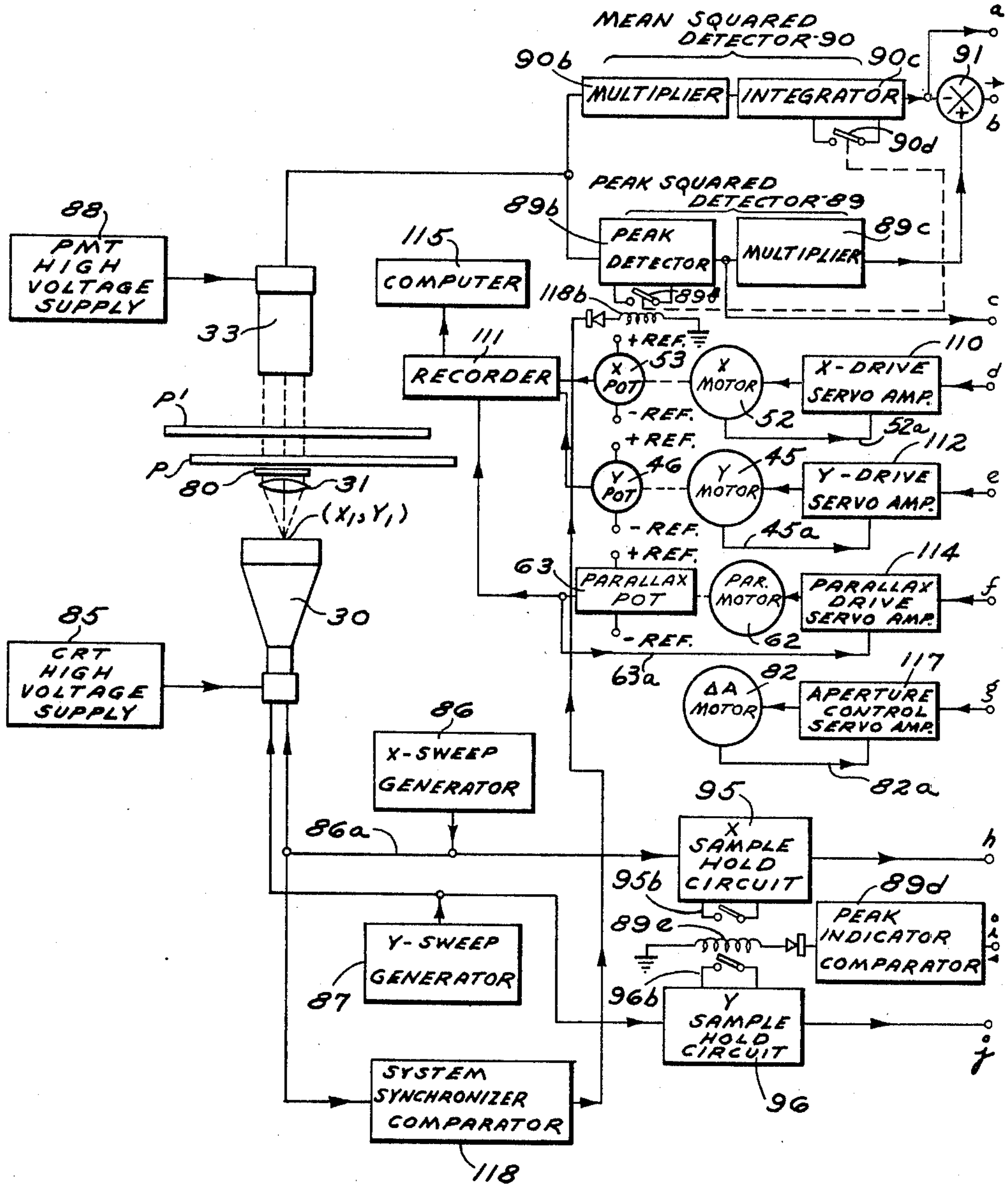
FIGURE 6 is an electrical block diagram shown on two sheets of known electronic and electric components connected according to the invention to provide an electrical output signal proportional to the misalignment of a selected pair of stereo images in the photographic transparencies.

A preferred embodiment is shown in FIGURES 5 and 6. FIGURE 5 is a partial, partially broken away, perspective view of the preferred embodiment. FIGURE 6 is a block diagram showing the controls and circuitry which are not shown in FIGURE 5.

In FIGURE 5 is shown a main housing 40 which supports or carries guide bar 41 and lead screw 42. Slidable along guide bar 41 is $y$ carriage 43 and threadedly engaged and movable along with lead screw 42 is $y$ carriage 44, which is moved along lead screw 42 when motor 45, which is connected to lead screw 42 for rotating lead screw 42, is energized. Connected to motor 45 is a potentiometer 46 for indicating the position of $y$ carriage 44 on lead screw 42.

Transverse support bars 47, 48 are supported and carried by $y$ carriages 43 and 44. Cradle 50 is slidable along bar 47 in the $x$ direction and threadedly engaged with threaded support bar 48. Movement of cradle 50 is accomplished when bar 48 is rotated by means of motor 52 which has a potentiometer 53 connected at the end thereof for indicating the position of cradle 50 along support bars 47, 48.

Slidable along and supported by both bars 47 and 48 is outer frame 58 which is threadedly engaged with and movable along parallel lead screw 59, which has spur gear 60 fixed to one end thereof. Spur gear 60 is threadedly engaged with worm gear 61 which is turned by motor 62, with potentiometer 63 being attached to motor 62 and turned by motor 62 to indicate the position of outer frame 58 along lead screw 59.

Supported centrally of outer frame 58 is disc frame 70 which supports the edges of photo transparency P′. Disc frame 70 is rotatable about its vertical axis by turning of flight line adjustment thumb screw 71. By rotating disc frame 70, and hence photo transparency P′, deviations by the airplane in angle or alignment between the taking of photo transparencies P and P′ can be compensated for.

A disc frame 73 is supported by cradle 50 directly below disc frame 70. Photo transparency P is held securely by disc fram 73 in substantial vertical alignment with photograph P′.

The following structure is supported independently of cradle 50 and $y$ carriages 43, 44 in the positions shown in FIGURE 5 by means not shown in order to present a more simplified and easily understood drawing, but which may be of a conventional nature. Cathode ray tube 30 having a spot ($U_1$, $V_1$) appearing on the face thereof and movable in a controlled manner across the face 30 thereof, is supported below and in vertical alignment with a collimating lens 31 which in turn is supported below and in alignment with a motor driven adjustable iris diaphragm assembly 80 having an iris structure 81 which has an opening centrally thereof which may be opened or closed by the operation of motor 82. Located in vertical alignment with and above iris assembly 80 is a photo multiplier tube 33 which has its face 34 placed sufficiently close to photo transparency P′ so that it can include the light rays from the collimated beam, emanating from cathode ray tube 30.

Generally then, cradle 50 which supports photo transparencies P and P′ is movable forward and backward in housing 40, or in the Y direction, by operation of motor 45 turning lead screw 42. Cradle 50 is movable from side to side in housing 40, or in the X direction, by the operation of motor 52 turning lead screw 48. Means shown in FIGURE 6, next to be described, operate motors 52 and 45 automatically to keep the correlation spot in the center of photomultiplier tube 33.

The height of the contour line traced is determined by the X direction or side position of photo transparency P′ relative to photo transparency P and this relative position may be changed by rotation of lead screw 59 by motor 62. Lead screw 59 is threadedly engaged with outer frame 58 and causes it to slide along both bar 47 and screw 48.

FIGURE 6, which is a schematic diagram of the electrical circuitry for moving cradle 50 automatically to keep the correlation spot centered on photo multiplier tube 33, will now be explained with the aid of the waveforms shown in FIGURE 7 which illustrate the waveforms for two sweeps of the X voltage existing in the circuit of FIGURE 6 at the points indicated. FIGURE 6 appears on two separate sheets with connecting points *a-j* on one sheet being common, respectivley, with connecting points *a-j* on the other sheet.

Cathode Ray Tube 30 is supplied with a high voltage from Source 85 and has applied to one set of its deflection plates a sweep voltage from Generator 86 in the X plane and from Generator 87 from the Y plane. The X sweep voltage present in line 86*a* is shown in *graph A* of FIGURE 7. The Y sweep is of a similar shape, but is a predetermined amount slower.

A spot ($X_1$, $Y_1$) is formed on the face of tube 30 and is collimated by lens 31 which passes through iris 80, photo transparencies P and P', and is received by photo multiplier tube 33 which receives its high voltage supply from source 88. The output of tube 33 existing in line 33*a* is shown in *graph B* of FIGURE 7 and is processed to see if the high peaks are correlation points or just noise by means next described.

The signal from tube 33 is sent through line 33*a* to Peak Squared Detector 89 which comprises a Peak Detector 89*b* and Multiplier 89*c*, and Mean Squared Detector 90 which comprises Multiplier 90*b* and Integrator 90*c*. Peak Squared Detector 89 processes the signal to give the waveform 89*a* shown in *graph C* of FIGURE 7 and in effect senses the peak voltage from the waveform 33*a* and holds it until a higher peak is received and then this is held, etc. Every time a new higher peak is received by Peak Detector 89*b*, Differentiator and Peak Indicator 89*d* sends a voltage pulse through coil 89*e* closing switches 95*b* and 96*b*, as later described.

The Mean Squared Detector 90 takes the average of the square of the input quantity which in effect indicates the general noise level. This is shown in *graph D* of FIGURE 7 and exists in output 90*a*.

Figure 7:
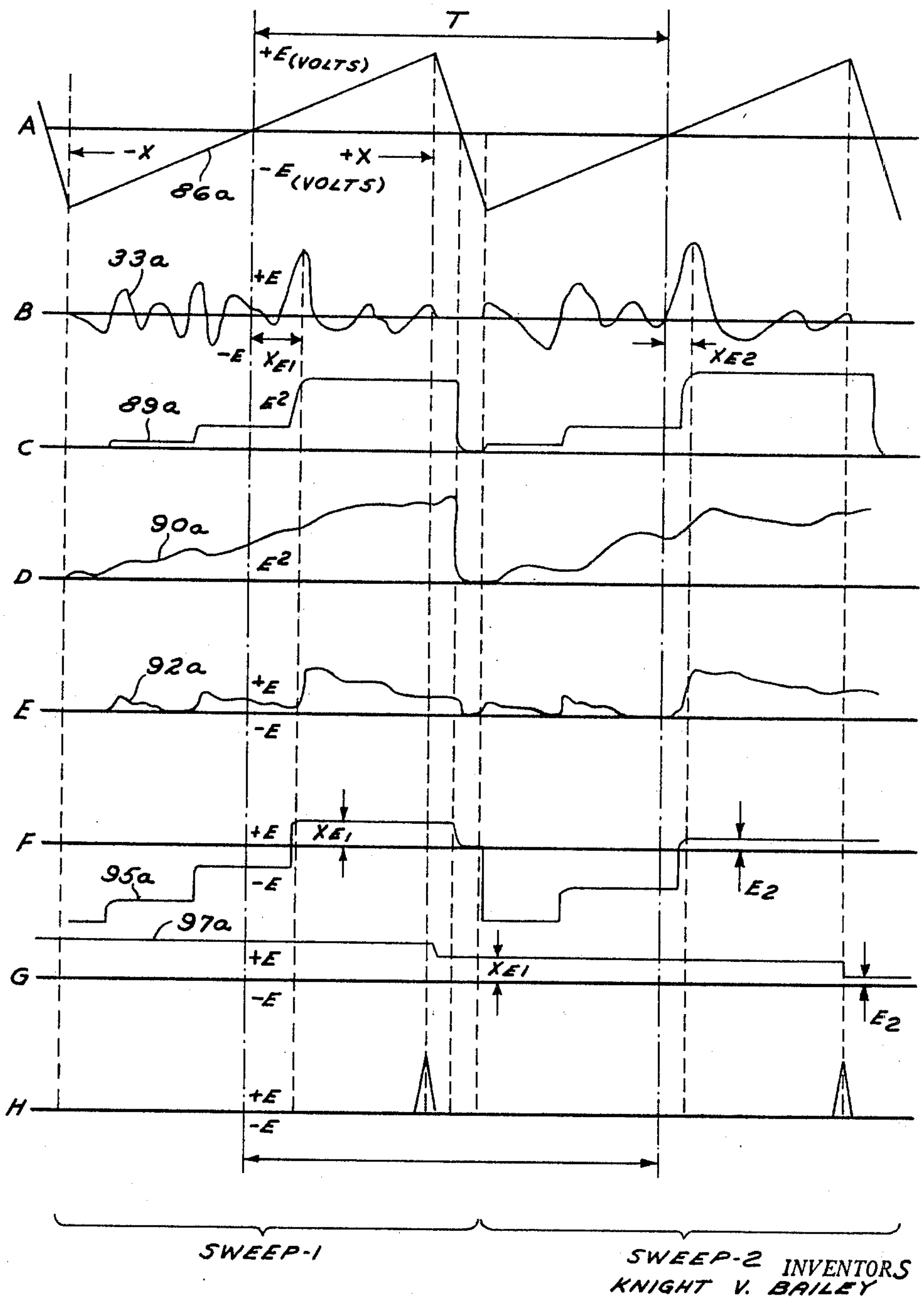
FIGURE 7 shows the signal waveforms at points A through H in the circuit block diagram of FIGURE 6 for a condition of misalignment of the conjugate images in the stereo transparencies with the waveforms in sets 1 and 2 representing theoretical outputs for two consecutive sweeps in the raster generated on the face of the cathode ray tube.

The difference between the signals from Peak Squared Detector 89, or the signal, and the Mean Squared Detector 90, or the noise, is taken by Sum and Difference member 91 and fed to Signal to Noise Detector 92 which has an output 92*a*, as shown in *graph E* of FIGURE 7. The purpose of Signal to Noise Detector 92 is to emit a signal only when the signal to noise ratio as determined by the difference from the outputs of Peak Squared Detector 89 and Means Squared Detector 90 is a predetermined minimum, thereby preventing a large magnitude signal from going through if it is only slightly above the noise level. This prevents false correlation signals.

The X Sample Hold Circuit 95 receives a signal from Sweep Generator 86 which is operative only when switch 95*b* is closed which happens when coil 89*e* is energized by Peak Squared Detector 89. The purpose of X Sample Hold Circuit 95 is to relate the peaks coming from Detector 89 to the value of the sweep voltage at the time the peaks occur and then hold this value of sweep voltage until the next peak occurs. Therefore, the value at any time of the output curve from Hold Circuit 95, which is shown as 95*a* in *graph F* in FIGURE 7, is the value of the X sweep voltage at the time of the largest peak. Curve 95*a* changes value only if the incoming peak is larger than the largest previous peak.

Likewise Y Sample Hold Circuit 96 receives a signal from Y Sweep Generator 87 when switch 96*b* is closed which happens when a new maximum or peak is detected. Circuit 96 sends a signal to Y Position Detector 98.

X Position Detector circuit 97 receives a signal from X Sample Hold Circuit 95 and is operative only when switch 97*b* is closed which happens when coil 92*b* is energized by Signal-to-Noise Detector 92. The purpose of X Detector Circuit 97 is to select and hold for the following sweep, the highest voltage level from X Sample Hold Circuit 95 on the previous sweep, which has the predetermined required minimum signal to noise ratio as determined by Detector 92. This prevents a maximum from being selected unless it is appreciably above the noise level at the time that the peak occurred.

Similarly Y Position Detector 98 receives a signal from Y Sample Circuit 96 and is operative only when switch 98*b* is closed which happens when coil 92*b* is energized by Detector 92. Y Position Detector 92 then holds the highest voltage level from Y Sample Hold Circuit 96 and sents its output to a Recorder 111 for recording the Y coordinate at which the correlation maximums occur.

The signal from X Position Detector 97 is fed to Velocity Resolving Servo Amplifier 99 which integrates the waveform 97*a* and applies a corresponding voltage to motor 100 which rotates shaft 101 to a position corresponding to the voltage received from Velocity Resolving Servo Amplifier 99. Feedback 100*a* maintains shaft 101 at precisely the position corresponding to the voltage signal developed by Servo Amplifier 99.

Shaft 101 drives Resolver 102 which divides a reference signal, obtained by means to be next described, into two voltages, one corresponding to the X velocity to be imparted to cradle 50, and one corresponding to the Y velocity to be imparted to cradle 50.

Mechanism is provided for limiting the velocity of cradle 50 to a predetermined maximum. This is desirable because otherwise a large error signal from Detector and Filter 97 would result in a correspondingly large voltage delivered to move cradle 50 to correct for the error, resulting in hunting and excessive wear on carrier parts. In order to accomplish this, a signal from Detector 97 is sent to a Differentiating Circuit 103 which senses the slope on the error curve and produces a correspondingly large voltage for a large error. This voltage is substracted in Sum and Difference member 104 from a reference voltage which is obtained from a potentiometer 105. This difference is sent to Amplifier 106 wherein it is amplified and then supplied as the reference voltage as before mentioned, to Resolver 102.

In order to prevent the error signal from reversing shaft 101 and causing a retrace of a contour already plotted, the output of differentiating circuit is connected to a Comparator 107 which compares the error signal with a reference signal 108 and if the error signal exceeds the reference signal, a Relay 109 is actuated to reverse the direction of the voltage to the windings in motor 100 and hence reverse the direction of rotation of shaft 101 so that the error will become smaller instead of larger.

The X velocity signal from Resolver 102 is fed to X Drive Servo Amplifier 110 which amplifies the signal and provides a driving voltage to X motor 52 which drives lead screw 48 as shown in FIGURE 5, and also drives X potentiometer 53 which develops a signal for Recorder 111. Feedback 52*a* increases accuracy and reduces hunting.

The Y voltage signal from Resolver 102 is fed to Y Drive Servo Amplifier 112 which develops a signal for driving Y motor 45 which turns Y potentiometer 46 varying a reference voltage corresponding to the potentiometer position and also delivering this to recorder 111 where a constant record is maintained of the X and Y potentiometer positions for determining a contour. A feedback 45*a* exists between Y motor 45 and Y drive servo amplifier 112 to increase accuracy and minimize hunting.

An adjustable potentiometer 113 adjusts a reference voltage 113*a* corresponding to its setting and delivers this voltage to Parallax Drive Servo Amplifier 114 for driving parallax motor 62 (FIGURE 5) and driving parallax potentiometer 63 which varies a reference signal and delivers this to recorder 111. As explained previously, the setting of potentiometer 113 determines the relative horizontal displacement between photo transparencies P and P' thereby selecting the height at which a contour will be made.

A signal is taken from Mean Squared Detector 90 passed through filter 116 and then to Aperture Control Servo Amplifier 117 which develops a signal for aperture motor 82 which controls the size of aperture 81 in FIGURE 5. A feedback 82*a* between motor 82 and amplifier 117 completes the servo circuit.

The purpose of the aperture control 117 is to limit the area correlated to that which is of approximately equal elevation, when the system is contouring, or more generally to those areas of P and P' where the images are matched. For example, if the aperture is too small then the integration area is too small and not enough information is available for the optimum correlation. On the other hand, if the aperture size is too large, integration area will be too large and the light from non matched areas will tend to obscure the correlation peak from the matched areas, again making it difficult to distinguish the correlation peak.

Waveforms for two complete sweeps are shown in FIGURE 7. In order that the various elements of the circuit are started at precisely the same time, a System Synchronizer 118 is provided, which is triggered by X sweep generator 86 and provides a pulse *waveform H* of FIGURE 7 through coil 118*b* which sets Integrator 90*c* and Peak Detector 89*b* to zero by closing switches 90*d* and 89*f*.

The system described illustrates a manner and means for tracing identical lines from two stereophotographs and in order to make a complete stereoplotter, the information developed and fed to recorder 111 must further be processed so that variables such as earth curvature, atmosphere refraction, and lens distortion, are compensated for. A manner in which this can be done is by providing a computer 115 similar to that disclosed in an article by E. C. Johnson in Photogrammetric Engineering, September, 1961, p. 583 to 589.

*Profile operation*

To this point, a system has been described for plotting contour lines, but this system is equally capable of plotting profile lines, or lines which indicate height over a given cross section, by moving the switches 119*a* to 119*d*, which are mechanically connected, from the Contour position to the Profile position.

In the Profile positions, a given X drive to X motor 52 is determined by the position of potentiometers 105 and a given Y drive to Y motor 45 is determined by the position of potentiometer 113. Potentiometers 105 and 113 may be varied to obtain any cross section of the stereophotographs P and P'.

When switches 119*c* and 119*d* are in the Profile position, the X position Detector 97 is connected directly to the Parallax Drive Servo Amplifier 114. The voltage from X Detector 97 indicates how far the correlation spot is from the center of photo tube 33 and Parallax Drive Servo Amplifier 114 is connected so that it will drive Parallax motor 62 in an opposite direction to the voltage received to thereby minimize the voltage error signal and maintain the correlation spot on the center of photomultiplier tube 33. The corrections made by parallax motor 62 are sent by potentiometer 63 to Recorder 111.

The parts in the above description are commercially available and could be selected readily by one skilled in the art. Also, the basic components of the following circuits are shown in the corresponding references:

| | |
|---|---|
| Peak Detector 89*b* | "Analog Computation," vol. 1, S. Pifer, p. 278, McGraw-Hill. |
| X and Y Sample Hold Circuit 95, 96<br>X and Y Position Detector 97, 98 | "Electronic Analog Computers," second edition, Korn & Korn, p. 385, McGraw-Hill. |
| Signal to Noise Detector | "Electronic Analog Computers," (as above) p. 428, No. 6.6. |
| System Synchronizer 118<br>Signal to Noise Detector 92<br>Peak Indicator 89*f* | "Analog Computation," (as above) p. 268. |

A second preferred embodiment utilizing the above concept for tracing contour lines is shown in FIGURE 8. A frame 130 having upper arm 132 intermediate arm 134 and lower arm 136, is movably supported on a base 138.

Upper arm 132 contains a filament 140 which is connected to and energized by a filament control 142 in lower arm 136. Placed below filament 140 is a diffusion plate 144 which causes the light from filament 140 to be distributed evenly. Placed below plate 140 is a first convex lens 146. Diffusion plate 144 is in the focal plane of lens 146 and the light rays leaving the lower side of lens 146 are parallel. Field stop 148 also is supported by upper arm 132 and limits the area of light from lens 146 to a predetermined area.

Intermediate arm 134 contains a second field stop 150 for maintaining a well defined column of light. Lower arm 136 contains second convex lens 152, which focuses the parallel rays of light onto a photo cell 154 which is in the focal plane of lens 152. A beam splitter 156 is placed in the path of the light rays and reflects a portion of the light rays to a photo cell 158 which measures the total intensity of the light rays. This information is sent to control 142 to increase or decrease the intensity of filament 140 to maintain it at a predetermined level.

Photocell 154 is called a radiation tracing transducer and a satisfactory transducer is commercially available from Micro Systems, Inc., Pasadena, California, their Model XY-20. It is shown in more detail in FIGURE 9 and is a single element photo voltaic device which has two outputs 160 and 162 which give voltages corresponding to where the light spot is on the face of the cell 154. For example, if the spot is at S then a voltage of $y$ will appear at meter 160 and a voltage of $x$ will appear on meter 162, but if the spot is at S', or the center of cell 154, no readings will be on either meter 160 or 162.

Also usable for a photocell would be a large number of small individual cells having individual leads connected so that it is known exactly which area of the composite photocell is receiving the correlation spot.

The outputs of photocell 154 are connected to an X Error Component Input to base 138 and a Y Error Components Input to base 138 which contains any suitable error compensating servomechanism for moving frame 130 according to the error signals to keep the spot of photocell 154 centered at all times. As frame 130 moves, it causes a tracer 170 to trace a contour line on map 172.

A transparency holder 174 is supported between upper arm 132 and intermediate arm 134 of frame 130 independently of frame 130. Likewise transparency holder 176 is independently supported between intermeidate arm 134 and lower arm 136 of frame 130 so that the frame 130 can move without moving holders 174, 176. Holder 176 is supported on threaded member 178 and turning of member 178 will cause holder 176 to move to the right or the left as shown in FIGURE 8. This initial adjustment determines the ΔY of FIGURE 2 and hence what elevation will be traced by tracer 170, since for every value ΔY, contour lines of a corresponding elevation become aligned. Member 178 is supported on threaded crank 179, FIGURE 8*a*, for forward and reverse adjustment of holder 176 relative holder 174. This may be necessary to correct certain errors due to atmospheric refraction, the photographs not being exactly oriented, or the like.

In the operation of this preferred embodiment, a negative transparency P is placed in holder 174 and negative transparency P' is placed in holder 176. Photographs P and P' are stereo photographs taken at spaced points above a certain area of terrain. Member 178 is then adjusted to place photograph P' in proper relationship to photograph P corresponding to a desired elevation. Light from diffusion plate 44 then is formed into parallel rays by lens 146 when passes through both photographs P and P' and then the rays are caused to converge by lens 152 onto photo cell 154. Since two negatives are being used, a light spot will be formed on a dark background on the face of photocell 154. Beam splitter 156 causes photocell 158 to be illuminated which indicates whether the total intensity is at the proper level and if not, filament 140 is adjusted to bring it to the proper level.

If the dot formed on photocell 154 is not at the center (S' in FIGURE 4), an error signal will be sent to base 138 moving frame 130 until the dot is on center. While this is happening, tracer 170 forms a contour line on map 172.

After a contour line has been completed, crank 178 is given an adjustment corresponding to a second elevation and a contour is traced for that elevation and so on until all desired contours are completed.

If desired, a profile may be obtained by operating crank 178 while a steady motion is imparted to frame 130. The movements imparted to cranks 178 and 179 in most cases would be performed in accordance with programming fed to a computer, not shown, which would operate the cranks.

By axially or vertically separating transparencies 174, and 176, the size of the maximum spot on photocell 154 will be attenuated and bringing them closer together will amplify the image of the correlation maximum or minimum on the screen.

In order to present a more simplified showing of the embodiments, in many instances a power supply has not been shown for operating various components in these embodiments, but the need and placement of such power supplies will be obvious to those skilled in the art.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A stereo perception system comprising
means to form a spot of light,
means to collimate the rays of said spot of light,
holding means to hold a pair of stereophotographic transparencies so that the collimated light rays are first modified by one stereophotographic transparency and then modified further by the second stereophotographic transparency so as to form a correlation peak when the collimated rays of the spot of light pass through identical portions of said transparencies,
detecting means to detect said correlation peak,
means to cause said spot of light to scan said stereophotographic transparencies,
indicating means to indicate at what position of said spot of light said correlation peak occurs.

2. The system of claim 1 with
positioning means to move said stereophotographic transparencies relative to said means to form a spot of light and said detecting means, to keep said correlation peak at a predetermined position on said detecting means.

3. The system of claim 1 with
recording means to record relative movement between said stereophotographic transparencies and said means to form a spot of light.

4. The system of claim 1 with
iris means for regulating the size of area examined on said transparencies to maximize the correlation peak.

5. The system of claim 1 with
means to move one stereophotographic transparency in its own plane relative to the other stereophotographic transparency.

6. The system of claim 2 with
profiling means for moving said stereophotographic transparencies relative to said means to form the spot of light in a predetermined path and for moving one stereophotographic transparency relative to the other to maintain said correlation peak at said predetermined position on said detecting means.

7. A stereo perception system comprising
light means to cause a spot of light to move in a predetermined pattern,
lens means to collimate the rays of said spot of light,
holding means to hold a pair of stereophotographic transparencies so that the collimated light rays are first modified by one stereophotographic transparency and then modified further by the second stereophotographic transparency so as to form a correlation peak when the collimated rays pass through identical portions of said transparencies,
detecting means to detect said correlation peak,
indicating means to indicate at what position of said moving spot of light said correlation peak occurs,
positioning means to move said stereophotographic transparencies relative to said light means and said detecting means to keep said correlation peak at a predetermined position on said detecting means,
said detecting means comprising,
a photomultiplier tube,
a peak detector for detecting and holding the maximum peak in a predetermined time period,
a mean squared detector for squaring the output of said photomultiplier tube,
a signal to noise detector which compares the outputs of peak detector and the mean squared detector and emits a signal only when the ratio is greater than a predetermined minimum.

8. A stereo perception system comprising
light means to cause a spot of light to move in a predetermined pattern,
lens means to collimate the rays of said spot of light,
holding means to hold a pair of stereophotographic transparencies so that the collimated light rays are first modified by one stereophotographic transparency and then modified further by the second stereophotographic transparency so as to form a correlation peak when the collimated rays pass through identical portions of said transparencies,
detecting means to detect said correlation peak,
indicating means to indicate at what position of said moving spot of light said correlation peak occurs,
positioning means to move said stereophotographic transparencies relative to said light means and said detecting means to keep said correlation peak at a predetermined position on said detecting means,
said positioning means comprising,
sample hold means for holding the value of a voltage corresponding to the position of the movable spot of light at the time that said correlation peak is detected.

9. A stereo perception system comprising
light means to cause a spot of light to move in a predetermined pattern,
lens means to collimate the rays of said spot of light,
holding means to hold a pair of stereophotographic transparencies so that the collimated light rays are first modified by one stereophotographic transparency and then modified further by the second stereophotographic transparency so as to form a correlation peak when the collimated rays pass through identical portions of said transparencies,
detecting means to detect said correlation peak,
indicating means to indicate at what position of said moving spot of light said correlation peak occurs,
positioning means to move said stereophotographic transparencies relative to said light means and said detecting means to keep said correlation peak at a predetermined position on said detecting means,
said positioning means comprising,
means connected to said indicating means to develop an error voltage proportional to the position of said correlation peak,
motor means connected to said last means for translating said developed error voltage to a corresponding motor shaft position,
resolver means for resolving a reference voltage to two coordinate voltages corresponding to said motor shaft position,
differentiating means for reducing said reference voltage for large error voltages so that the error correction is made relatively slowly,
comparator means connected to said differentiator means to reverse direction of said motor means if the error signal is increasing, X and Y servos being connected to said resolver means for receiving said coordinate voltages and moving said positioning means to keep said correlation peak at said predetermined position.

References Cited by the Examiner

UNITED STATES PATENTS

| | | | |
|---|---|---|---|
| 2,787,188 | 4/1957 | Berger | 88—14 |
| 2,871,759 | 2/1959 | Sconce et al. | 88—14 |
| 2,912,761 | 11/1959 | Woodward et al. | 88—14 |
| 2,964,639 | 12/1960 | Hobrough | 250—217 |
| 2,964,644 | 12/1960 | Hobrough | 250—220 |
| 2,988,953 | 6/1961 | Barnett | 88—14 |
| 2,989,890 | 6/1961 | Dressler | 88—14 |
| 3,004,464 | 10/1961 | Leighton et al. | 88—14 |

RALPH G. NILSON, *Primary Examiner.*

ARCHIE R. BORCHELT, *Examiner.*

ELROY STRICKLAND, MICHAEL A. LEAVITT, *Assistant Examiners.*